(12) United States Patent
Putman et al.

(10) Patent No.: US 6,179,248 B1
(45) Date of Patent: Jan. 30, 2001

(54) AIRCRAFT

(75) Inventors: William F. Putman, Staten Is, NY (US); Brian Smith, Lawrenceville, NJ (US)

(73) Assignee: Aereon Corporation, Princeton, NJ (US)

(*) Notice: Under 35 U.S.C. 154(b), the term of this patent shall be extended for 0 days.

(21) Appl. No.: 09/433,671

(22) Filed: Nov. 4, 1999

(51) Int. Cl.[7] ...................................................... B64C 3/30
(52) U.S. Cl. ..................... 244/36; 244/153 R; 244/154; 244/900; 244/901; 244/35 R; 244/117 R
(58) Field of Search ................................. 244/153 R, 154, 244/900, 901, 36, 35 R, 117 R (56) References Cited

U.S. PATENT DOCUMENTS

| | | | |
|---|---|---|---|
| 3,151,825 | 10/1964 | Kindling | 244/33 |
| 3,584,813 | 6/1971 | Sweeney et al. | 244/44 |
| 3,597,108 | 8/1971 | Mercer | 416/139 |
| 3,599,904 | 8/1971 | Condit et al. | 244/38 |
| 3,647,163 | 3/1972 | Sweeney | 244/49 |
| 4,461,438 | * 7/1984 | Pook et al. | 244/153 R |
| 4,708,078 | * 11/1987 | Legaignoux et al. | 244/900 |
| 4,722,498 | * 2/1988 | Cameron | 244/153 R |
| 5,681,010 | * 10/1997 | Jensen | 244/117 R |
| 5,816,537 | * 10/1998 | Pascoe et al. | 244/901 |
| 6,082,667 | * 7/2000 | Haggard | 244/35 R |

\* cited by examiner

*Primary Examiner*—J. Woodrow Eldred
(74) *Attorney, Agent, or Firm*—Howson and Howson

(57) ABSTRACT

An aircraft is composed of two elongated inflated, flexible tubes diverging from each other from a nose of the aircraft toward a trailing edge. First and second membranes span the upper and lower surfaces of the tubes respectively to provide upper and lower airfoil surfaces. One of the two membranes is connected to a length of cable extending from the tip end of one tube to the tip end of the other at the trailing edge. Trim is provided by a fixed flap composed of flexible membrane stretched between the cable and another, parallel cable. The nose ends of the tubes are secured to a propulsion motor-mounting plate assembly at the nose end of the aircraft, and the opposite ends of the tubes are secured to plates at the ends of the trailing edge. The cables are secured to the plates at the ends of the trailing edge, and these plates are also used to support horizontal stabilizers.

22 Claims, 7 Drawing Sheets

AIRCRAFT

SUMMARY OF THE INVENTION

This invention relates to aircraft, and particularly to a novel aircraft, suitable for unmanned operation, and deployable from a collapsed condition by inflation.

A delta-shaped, low aspect ratio, lifting body configuration has been found to be ideal for a large scale aircraft taking advantage of both aerodynamic and static lift, as described in U.S. Reissue Pat. Re. 28,454, dated Jun. 17, 1975. The delta-shaped lifting body configuration also exhibits desirable characteristics for use in heavier-than-air aircraft of various sizes. As stated in U.S. Pat. No. 3,684,217, dated Aug. 15, 1992, delta wing lifting bodies possess favorable stall characteristics and are capable of relatively high cruising speeds and low landing speeds. Moreover, they can be made to carry large payloads efficiently. For example, as described in U.S. Pat. No. 4,896,160, dated Jan. 23, 1990 and 5,034,751, dated Jul. 23, 1991, a delta-shaped lifting body aircraft is ideally suited as an airborne surveillance platform, carrying a large radar antenna array.

A delta-shaped lifting body is characterized by a generally triangular, or delta-shaped, planform with a narrow nose at one corner, leading edges extending from the nose to the respective opposite corners, and a trailing edge extending from one of said opposite corners to the other. The planform is substantially symmetrical about an imaginary plane of symmetry extending from the nose to the midpoint of the trailing edge. The cross-sections of the hull transverse to the plane of symmetry are generally ellipse-like at the leading edges, convex at the upper surface, and, depending on the airload, concave at the lower surface. These cross-sections progressively decrease in height, while continuing to increase in width, from an intermediate location near, but aft of, the nose of the aircraft toward the trailing edge. The cross-sections of the hull extending from the nose to the intermediate location at which the height of the cross-sections begins to decrease, may progressively increase both in height and width.

The delta-shaped lifting body has the advantages that its entire surface serves as an airfoil, and its internal volume provides a large payload-carrying space.

Heretofore, maintaining a lifting body shape required a complex array of tensioning cables connected to various points on the interior of the hull, or alternatively a rigid framework on the inside of the hull. Without tensioning cables or an internal framework, flexible material, when inflated, will assume the shape of a sphere, or at best a surface of revolution, e.g. a blimp, neither of which has desirable airfoil characteristics.

The principal object of this invention is to achieve a delta-shaped lifting body without the need for a rigid framework or a complex array of tensioning cables. Another object of the invention is to provide a delta-shaped lifting body which can be deployed from a collapsed condition by inflating it with a stored, compressed gas.

The aircraft in accordance with the invention comprises plural inflated, flexible tubes, preferably elongated and in the form of surfaces of revolution with coplanar axes substantially intersecting one another at a location adjacent the nose of the aircraft, and diverging from one another from the nose toward the trailing edge. Each tube has an upper surface and lower surface, a nose end, preferably with a large cross-section, adjacent to the nose of the aircraft and a tip end, preferably with a smaller cross-section, adjacent to the trailing edge of the aircraft. Each tube preferably tapers to its tip end at least from an intermediate location between its nose end and its tip end. A length of cable extends along the trailing edge and connects the tip end of each tube with the tip end of each adjacent tube. A first membrane spans the upper surfaces of the tubes and constitutes an upper airfoil surface of the aircraft. A second membrane spans the lower surfaces of the tubes and constitutes a lower airfoil surface of the aircraft.

The aircraft may also include a second length of cable extending substantially parallel to the first length of cable and positioned aft thereof, and a flap comprising a strip of flexible material extending from the first length of cable to the second length of cable.

In a preferred embodiment, each of the plural, inflated, elongated flexible tubes has a rigid plate located at its tip end, a clamping member fixed to the plate and extending into the interior of the tip end, and a clamping ring securing the tip end to the clamping member. The cable may be connected directly to each rigid plate. Preferably, at least one of the first and second membranes is connected to the length of cable. The cable preferably has a provision for tension adjustment, which may be threads at both ends, allowing the cable to be adjustably connected to the rigid plates by nuts engaged with the threads.

Each of the plural, inflated, elongated, flexible tubes also preferably has a rigid plate located at its nose end, a clamping member fixed to the plate and extending into the interior of the nose end, and a clamping ring securing the nose end to the clamping member.

The rigid plates at the nose ends of the tubes may be rigidly connected together, and a propulsion motor may be connected to the plates by a gimbal assembly.

The aircraft is capable of remote-controlled or programmed low-speed flight, and is particularly suitable as an unmanned platform for reconnaissance, surveillance, or electronic countermeasures (ECM), such as carrying a camera, radio or radar, equipment or other suitable surveillance or ECM devices. An important advantage of the invention is that it can be transported in a collapsed condition and deployed for flight by inflation. Thus the aircraft is especially suited for exploration in extraterrestrial planetary atmospheres by deployment from a spacecraft, and for deployment from an aircraft, guided missile, gun-launched projectile, etc.

Other objects, details, advantages and modifications of the invention will be apparent from the following detailed description when read in conjunction with the drawings.

DETAILED DESCRIPTION

Figure 1:
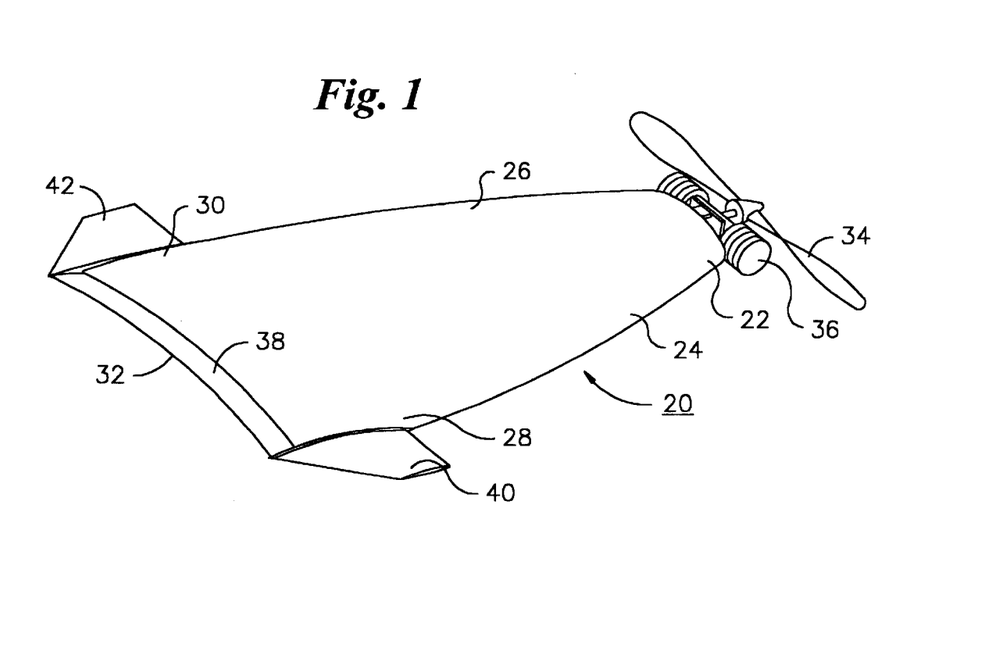
FIG. 1 is a schematic perspective view of an aircraft in accordance with a first embodiment of the invention.

A typical aircraft in accordance with the invention is the unmanned aircraft 20 shown in FIG. 1. The aircraft is in the form of a lifting body having a generally triangular, or delta-shaped, planform. The aircraft has a narrow nose 22 at one corner, leading edges 24 and 26 extending from the nose to the respective opposite corners 28 and 30, and a trailing edge 32 extending from one of said opposite corners to the other. The planform is substantially symmetrical about an imaginary vertical plane of symmetry (not shown) extending from the nose 22 to the midpoint of the trailing edge 32.

The transverse cross-sections of the hull progressively increase in width and decrease in height, from a location which may be very close to the nose 22, or a considerable distance aft of the nose, e.g. aft of the quarter-chord location. Because of the fact that portions of the aircraft are inflatable, and are connected by flexible membranes without rigid supporting structure, the shape of the cross-sections is influenced not only by the shape of the inflatable portions, but also by aerodynamic forces in flight. Thus, while the upper surface of the hull will ordinarily be convex, the lower surface may be concave, at least while the aircraft is in flight. The cross-sections of the forward portion of the hull progressively increase both in height and width from the nose to the intermediate location at which the height of the cross-sections begins to decrease.

A propeller 34 at the nose of the aircraft is driven by a two-cylinder internal combustion engine 36. The engine is preferably gimbaled so the direction of propeller thrust can be varied for steering and attitude control.

A fixed flap 38, constituted by a flexible membrane at the trailing edge 32, produces a positive pitching moment. The flap may be made adjustable, as discussed below.

Horizontal stabilizing airfoil surfaces 40 and 42 are provided at the opposite ends of the trailing edge. These surfaces may be drooped as described in U.S. Pat. No. 3,684,217, dated Aug. 15, 1972, to counteract oscillations that could otherwise occur because of the high sweep angle of the leading edges 24 and 26.

Figure 2:
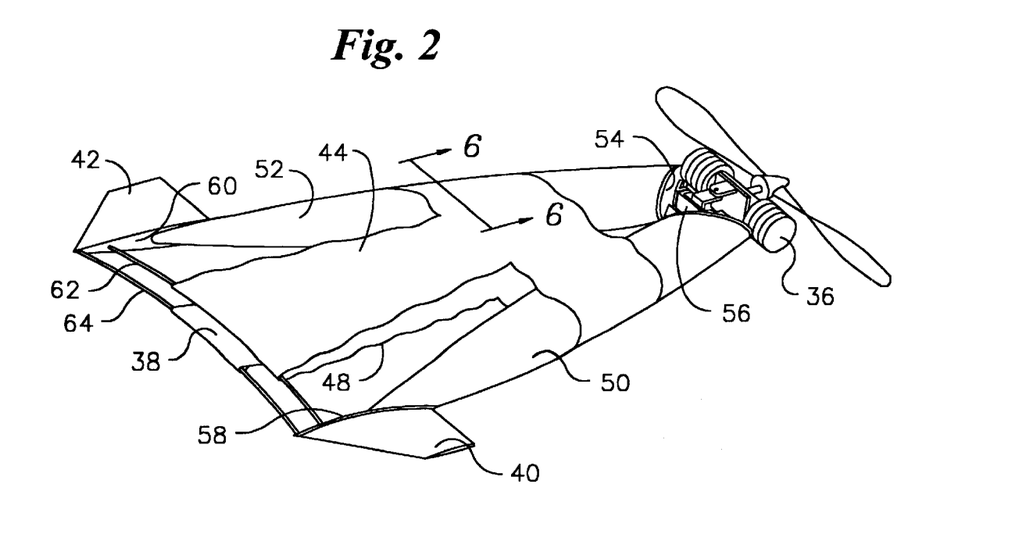
FIG. 2 is a broken-away schematic perspective view, corresponding to FIG. 1, illustrating the inflatable bodies of revolution, the membranes constituting the upper and lower airfoil surfaces, and the trailing edge cables.

As seen in FIG. 2, the hull of the aircraft is composed of upper and lower sections 44 and 48 of flexible membrane, supported by a pair of inflated tubular bodies of revolution 50 and 52. The forward end of tubular body 52 is secured to a plate 54, and the forward end of tubular body 50 is secured to a similar plate (not shown in FIG. 2). The two plates are rigidly connected together and situated in vertical planes which diverge symmetrically from each other. The two plates together provide a mount for the gimbal structure 56 of engine 36.

Each of the tubular bodies is formed of a gas-tight fabric and is inflatable. Its shape can be conical so that it tapers down throughout the entire distance from its nose end to its tail end. Alternatively, the tubular bodies can be cigar-shaped, as shown, having their maximum transverse cross-section at an intermediate location. The tubular bodies may also be provided with internal, gas-tight bladders, in which case their outer fabric need not be gas-tight.

The tail ends of the tubular bodies are secured to plates 58 and 60, which are situated in planes extending in the fore and aft directions. These plates serve as mounting plates for the airfoil surfaces 40 and 42, and are also used to support the ends of flexible cables 62 and 64. Cable 62 supports the trailing edge of the membrane structure comprising membranes 44 and 48, and cable 64 supports the trailing edge 32 of flap 38, the leading edge of which is attached to membranes 44 and 48. Cable 62, which assumes a catenary shape, provides a sharp trailing edge and a chordwise component of tension in the membranes 44 and 48, allowing them to support aerodynamic loads and thereby develop aerodynamic lift.

Figure 3:
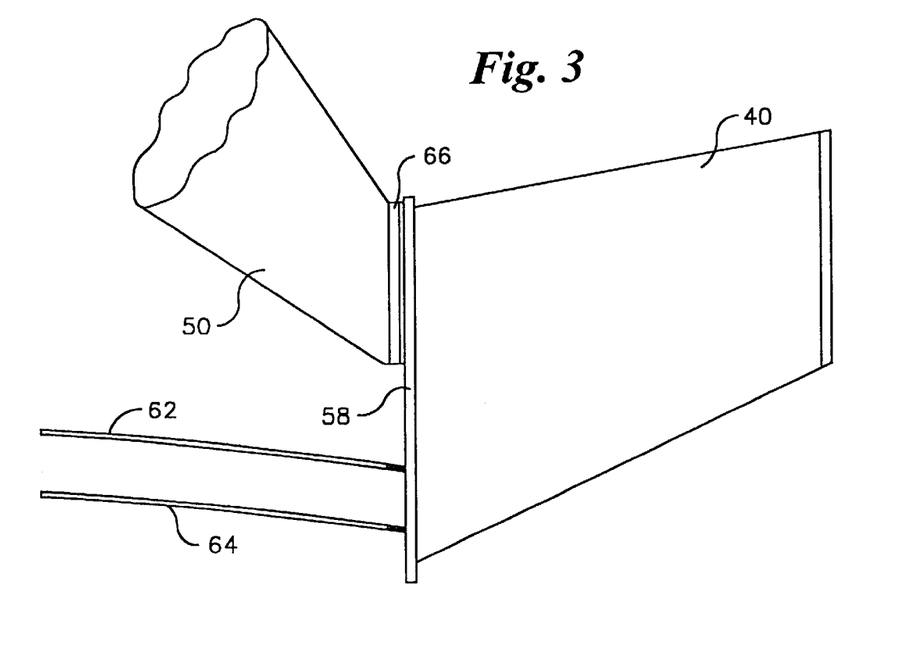
FIG. 3 is a fragmentary schematic view illustrating a part of the trailing edge structure of the aircraft.
Figure 4:
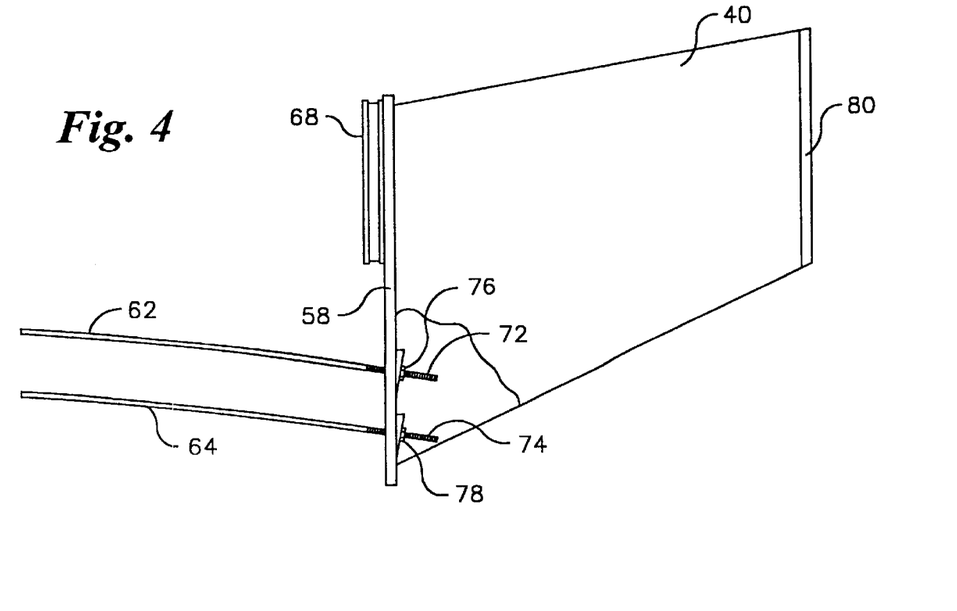
FIG. 4 is a fragmentary schematic view, similar to FIG. 3, but showing the manner in which tensioned trailing edge cables and an inflatable body of revolution are connected to a bulkhead.
Figure 5:
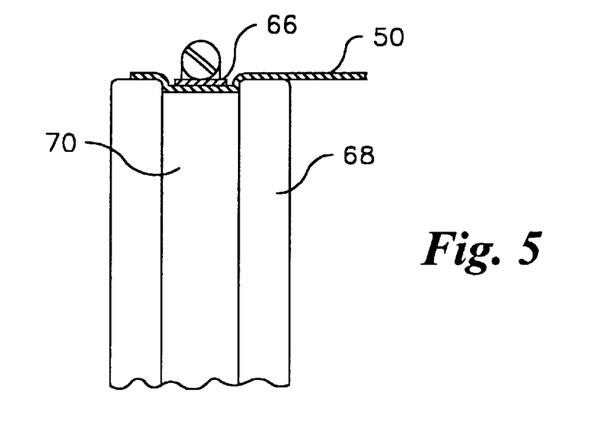
FIG. 5 is a fragmentary schematic view showing details of a connection of an inflatable body of revolution to a clamping ring.

As shown in FIGS. 3 and 4, body 50 is secured to end plate 58 by a clamping ring 66, which clamps the open end of the fabric onto an elliptically shaped clamping member 68 fixed to plate 58. Clamping member 68 has an annular recess 70, as shown in FIG. 5, into which the fabric of body 50 is pressed by clamping ring 66. The forward end of inflatable body 50 is secured to a clamping ring (not shown) in a similar manner, and the ends of inflatable body 52 are clamped similarly. Although the use of clamping rings is contemplated as a preferred method of securing the inflatable bodies to rigid components of the aircraft, various alternative techniques, such as bonding using high strength adhesives, could be used.

As shown in FIG. 4, cables 62 and 64 have threaded ends 72 and 74. Preferably, the cables are stranded stainless steel cables with threaded end fittings. A typical cable may be, for example, 0.032 inch in diameter. Nuts 76 and 78 are threaded onto the ends of the cables to anchor the cables to plate 58 and to permit adjustment of the tension in the cables. The cables are connected to plate 60 (FIG. 2) in a similar manner.

Each of the airfoil surfaces 40 and 42 can be constituted by a single inflatable body of revolution (not shown) at its leading edge and upper and lower membranes extending from the inflatable body of revolution to a tensioned trailing edge cable (not shown). As shown in FIG. 4, the airfoil surface 40 extends between plate 58 and an end plate 80. Alternatively, non-inflated tips can be used. For example, the tips could be formed from light-weight rigid foam covered with a weatherproof skin.

Figure 6:
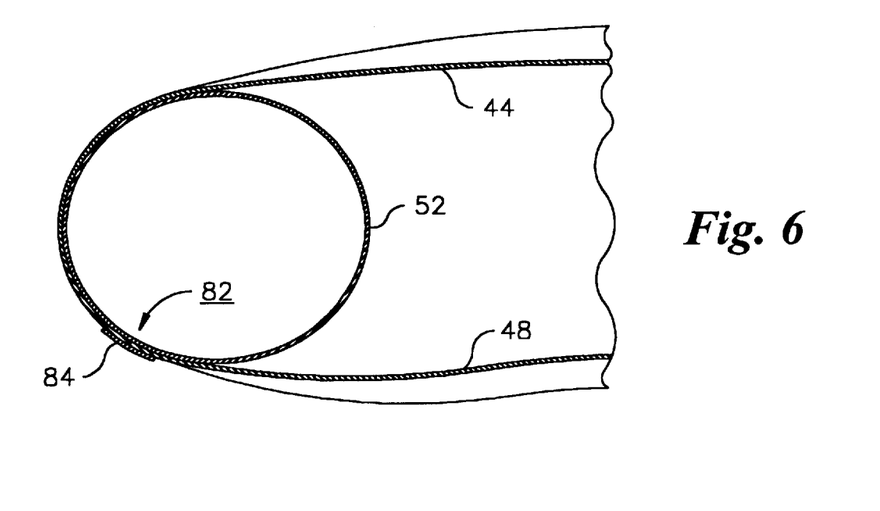
FIG. 6 is a sectional view taken on plane 6—6 in FIG. 2, illustrating the manner in which upper and lower airfoil membranes are connected to an inflatable body of revolution.

The cross-sectional view in FIG. 6 shows how the upper and lower membranes 44 and 48 are connected to inflatable body 52. The upper membrane extends over the top and outside of body 52, meeting the lower membrane 48 at the lower portion of the leading edge, preferably at or near the stagnation point 82. The membranes are bonded, sewn, or otherwise suitably secured to body 52, and are also secured together by a cap strip 84.

Figure 7:
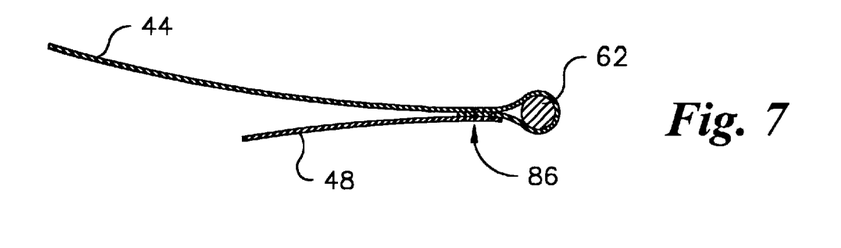
FIG. 7 is a sectional view illustrating the manner in which airfoil membranes are connected to a trailing edge cable.

FIG. 7 illustrates how the upper and lower membranes 44 and 48 are connected to cable 62. The upper membrane extends over and around cable 62, and is both bonded and sewn to itself and to the lower membrane 48 at location 86.

Figure 8:
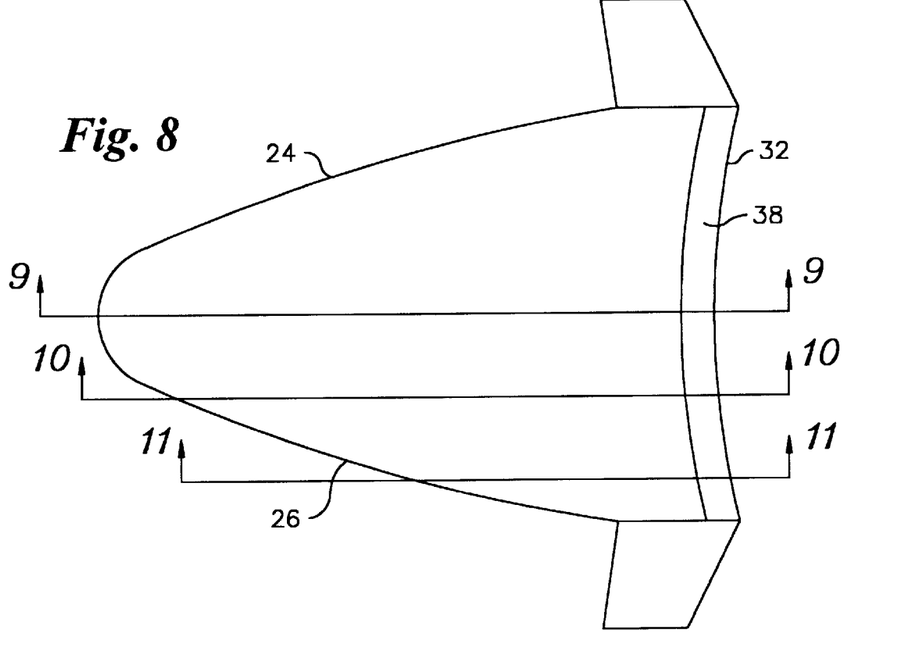
FIG. 8 is a schematic top plan view of the aircraft.

As shown in FIG. 8, the aircraft has a generally delta-shaped planform, with the leading edges 24 and 26 nearly straight and forming an acute angle with each other. In the case of tubes that are true cones, the leading edges will be straight. However, the tubes may be somewhat cigar-shaped, in which case the leading edges will be slightly curved. In either case, however, the leading edges will be nearly straight. The trailing edge 32 is concave as a result of the tension imparted to the cables 62 and 64 by the inflatable bodies 50 and 52 through the upper and lower membranes 44 and 48. Although the inflation of bodies 50 and 52 will itself impart tension to the trailing edge cables, optional rigid or inflatable struts (not shown) can be provided between the upper and lower membranes, ahead of the trailing edge, to hold the inflatable bodies apart. Still another way to hold the trailing ends of the inflatable bodies apart is to encase the trailing edge tension cable within a semi-rigid tubular strut, in which case the combination would be resistant both to tension and to compression.

Figure 9:
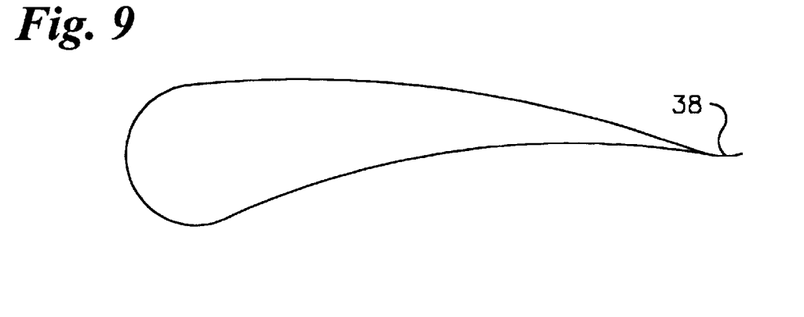
FIGS. 9, 10 and 11 are schematic cross-sectional views, showing the profile of the aircraft, taken on planes 9—9, 10—10 and 11—11 respectively in FIG. 8.
Figure 10:
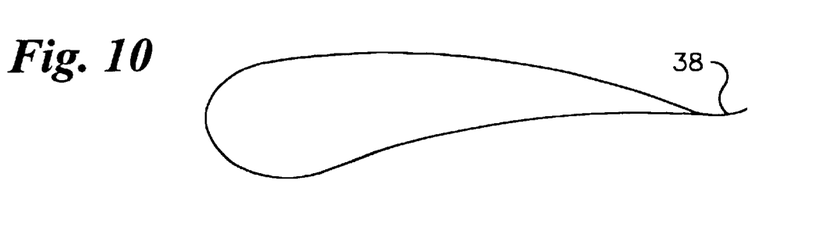
Figure 11:
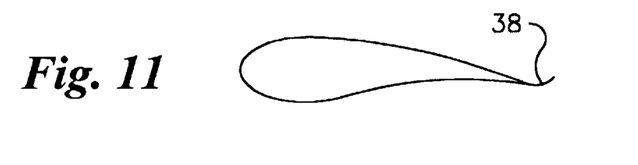

As shown in the profile views in FIGS. 9, 10 and 11, in flight the upper surface is convex throughout, while the lower surface is partly concave. The trailing edge flap 38 may be permanently trimmed, by positioning the end plate connections of cable 64 higher than the connections of cable 62. The trim establishes a downward aerodynamic load on the trailing edge to produce an upward pitching moment allowing low speed flight.

Figure 13:
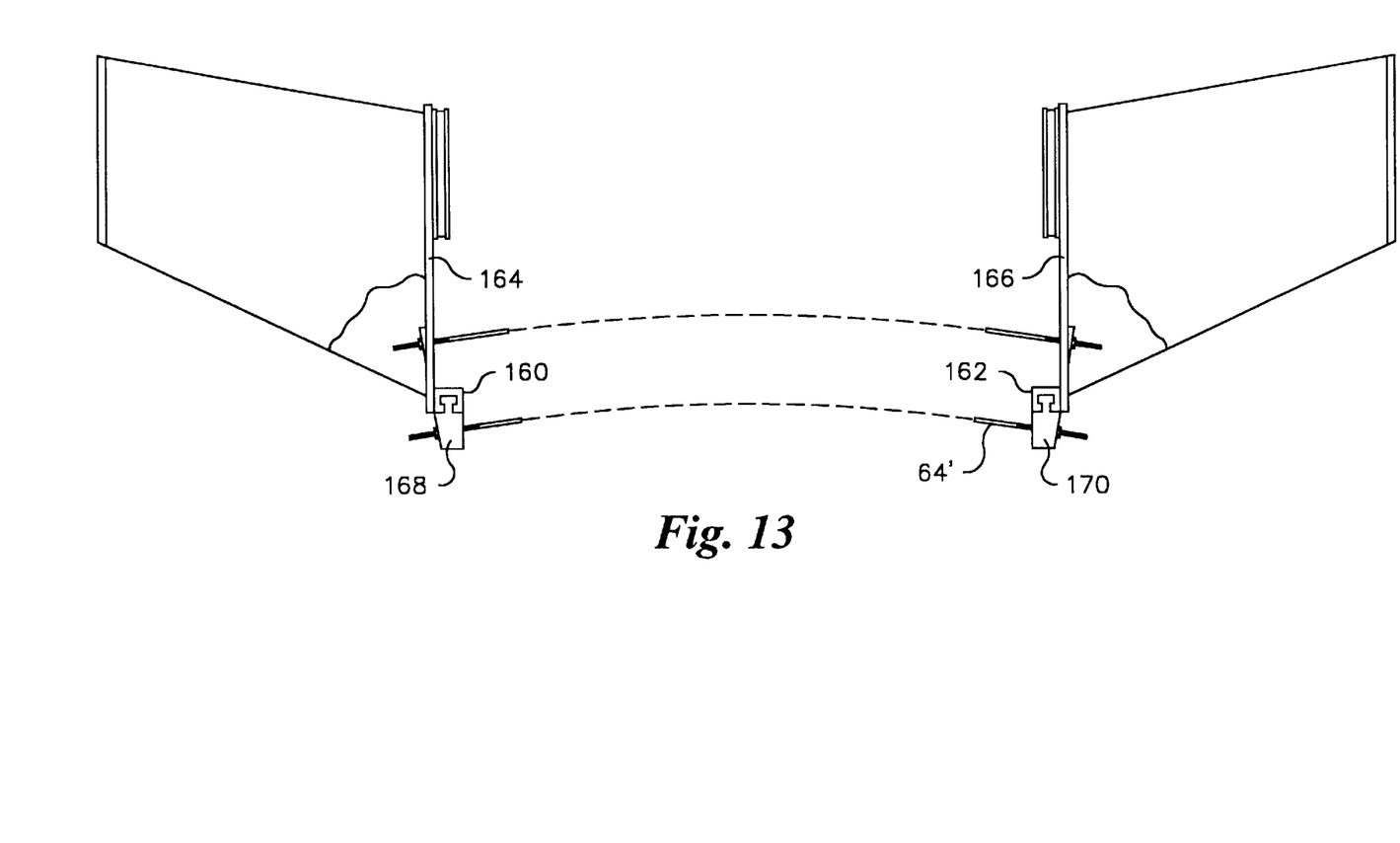
FIG. 13 is a schematic top plan view showing an aircraft in accordance with the invention, having an adjustable flap.

Alternatively, as shown in FIG. 13, adjustment of the trim can be effected by moving the connection points at the ends of cable 64' and thereby changing the flap deflection. The connection points can be made movable, for example, by mounting small electromechanical actuators 160 and 162 on plates 164 and 166 respectively, and connecting cable 64' to movable elements 168 and 170 of the actuators.

Figure 12:
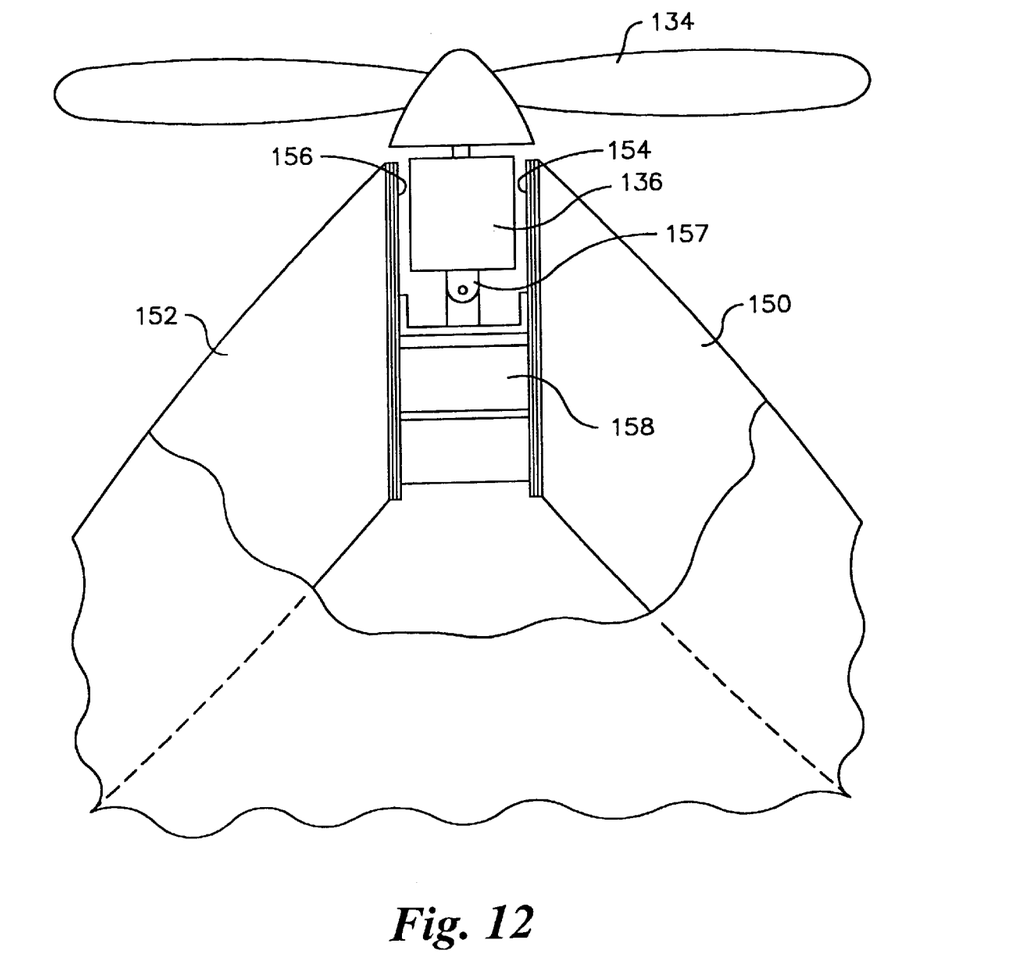
FIG. 12 is a fragmentary top plan view, partially broken away, illustrating the nose structure of an alternative embodiment of the aircraft.

In the alternative embodiment shown in FIG. 12, the inflated bodies of revolution 150 and 152 are clamped to plates 154 and 156, which are in spaced, parallel relation at the nose of the aircraft. A motor mount 158 is secured to, and located between, these plates. An electric motor 136 is supported from mount 156 through gimbal assembly 157, and drives propeller 134.

The bodies of revolution 50 and 52 in FIG. 2(or 150 and 152 in FIG. 12) can be air-inflated, or, where aerostatic lift is desired, can be filled with helium or another lighter-than-air gas. Whether or not aerostatic lift is significant, of course, depends on the overall size of the aircraft.

By way of example, typical airfoil and membrane shape parameters for the aircraft are as follows:

Thickness ratio, t/c=0.24

Camber, z/X=0.064

Trailing edge depth, x/b=0.2

Figure 14:
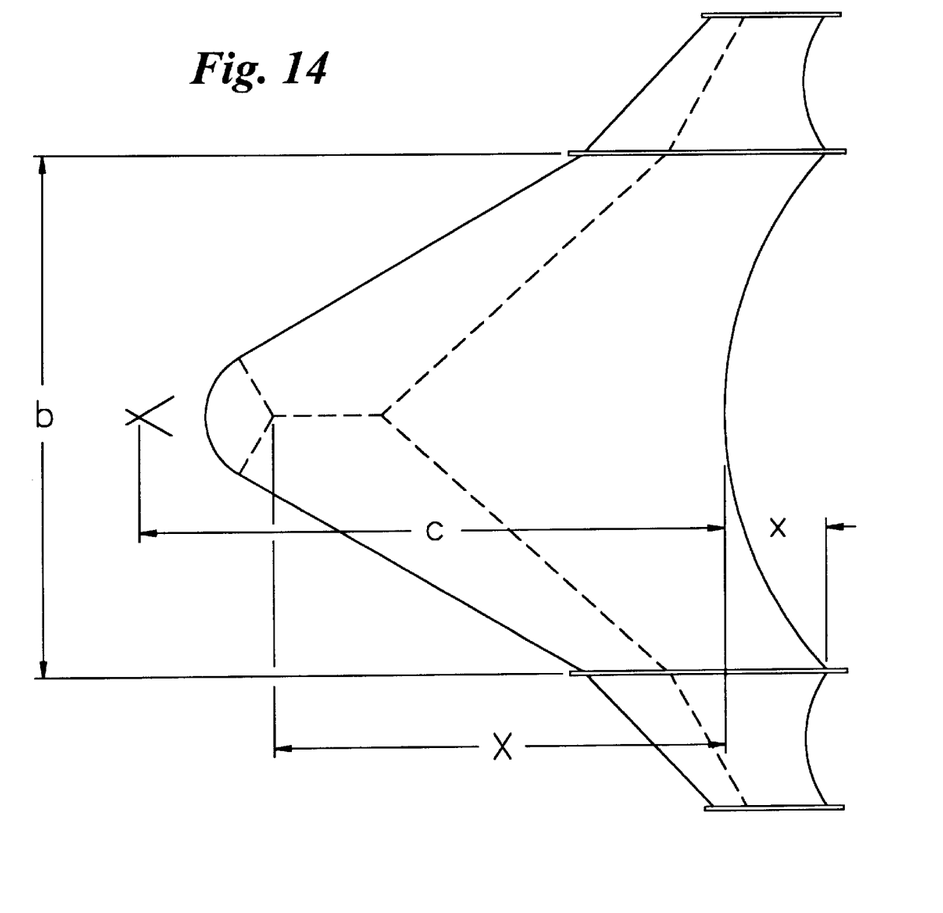
FIGS. 14 and 15 are respectively schematic top plan and side elevational views of an aircraft in accordance with the invention, illustrating various dimensional parameters referred to in the detailed description.
Figure 15:
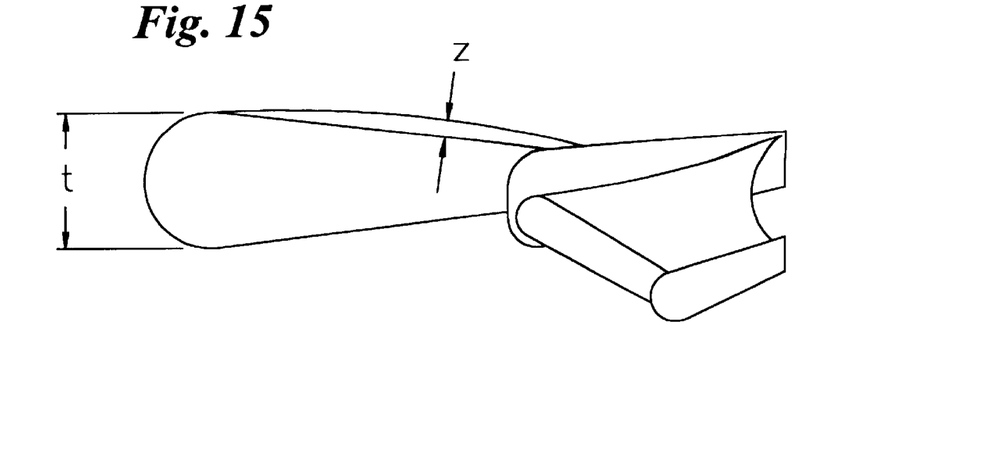

These parameters will be understood from reference to FIGS. 14 and 15, where:

t is the maximum thickness for any airfoil section;

c is the airfoil section chord defined from where the leading edges of the inflated cones would intersect;

z is the maximum deflection of the membrane relative to a straight line connecting the membrane's forward attachment point to the trailing edge;

X is the distance from the membrane's forward attachment point to the trailing edge;

x is the maximum depth of the trailing edge, i.e. the distance from the trailing edge at the plane of symmetry to the trailing edge at the tip of the body; and b is the span of the body, not including the tips.

The thickness ratio of 0.24 approaches the largest practical limit for acceptable aerodynamic characteristics in the Reynolds number range of interest. Smaller thickness ratios lead to higher stresses in the inflated bodies of revolution, whereas higher ratios produce peaks in pressure distribution which may lead to separation of flow, or membrane buckling or fluttering?

The preferred values for the membrane shape parameters, z/X and x/b, are based upon considerations of airfoil pressure distribution and longitudinal static stability and trim. Both higher camber and lower trailing edge depth lead to unacceptably high longitudinal trimming moments. Lower camber and greater trailing edge depth reduce the lift coefficient and force higher angles of attack. The higher angles of attack, in turn, contribute to deteriorating lateral-directional stability, and are preferably avoided. The above membrane shape parameters represent acceptable compromises in view of these trends.

It is not possible to incorporate reflex in the airfoil section of the membrane lifting surfaces. Therefore, to achieve a stable static margin, the flap, whether fixed or adjustable, is arranged to produce a positive pitching moment. Alternatively, the positive pitching moment may be produced by means of canards (not shown), or by carrying a download on airfoil surfaces 40 and 42. As explained previously, surfaces 40 and 42, if present, are desirably drooped, as described in U.S. Pat. No. 3,684,217. Because of the anomalous behavior of membrane wings at low angles of attack, the airfoil surfaces, if inflated, should have a negative pitch, e.g. about 20° with respect to the center-section chordal plane, to insure their proper operation at a negative lift coefficient. Airfoil surfaces 40 and 42 can be made adjustable. Adjustable airfoil surfaces can be used for flight control, either by themselves or in combination with adjustment of the flap and/or adjustment of the direction of thrust of the propeller.

The upper and lower membranes 44 and 48, and the bodies of revolution 50 and 52, may be fabricated, for example, from 5 oz./square yd. Dacron/Mylar laminated sailcloth. The choice of material and its weight may vary depending upon the size of the aircraft and the loads to which it is subjected.

The airfoil surfaces 40 and 42 may be fabricated from the same material as used for the main surfaces. The construction of surfaces 40 and 42, however, is simplified because there is no line of intersection between two generated surfaces. Instead each of the upper and lower membranes of surfaces 40 and 42 is composed of a single generated surface. The excess length, i.e. the amount of material allowing for the membrane to form a curve when subjected to aerodynamic loads, is determined by how the material is cut and attached to the trailing edge cable.

A nose fairing (not shown) can be provided at the nose ends of the bodies of revolution, cut out appropriately to provide clearance for the tilting movement of the propulsion motor.

For most applications, the aircraft will require some forward structure to carry electronics, fuel tanks, and other components in addition to the engine. Such components can be located between the upper and lower membranes, but attached to the rigid engine support structure to which the inflatable tubes are clamped. Alternatively, the forward structure and components can be enclosed in a rigid shell or "forebody" made of fiber-reinforced plastics or other lightweight, composite materials. The forward edges of the membranes may be attached to the rigid forebody by adhesive bonding or by other suitable means.

In those cases where the payload is very heavy, stiffeners may be provided to distribute the weight of the payload over a large area of the upper and/or lower membrane.

Depending upon the size of the aircraft and the flying qualities required, controls with better effectiveness than the gimbaled engine can be used. For example, the controls used to adjust the position of the flap cable 64 can also be operated together to control the pitch of the aircraft in flight, and differentially to control roll. For control, provision can also be made to adjust the angles of incidence of the outboard tips 40 and 42. Moreover, adjustable canard surfaces can be provided.

Various modifications other than those discussed above can be made to the aircraft. For example, although the preferred aircraft has two inflatable tubes, it is possible to realize some of the advantages of the invention in an aircraft having three or more tubes, for example one having a center tube in addition to the leading edge tubes. The tips of the tubes, can be received in rigid, conical members to which the trailing edge cable or cables can be attached. The inboard sides of the conical members can be extended along the inboard sides of the tubes to impart greater rigidity to the tubes. Inflatable or collapsible struts can also be connected to the extended inboard sides of the conical members. The shapes of the horizontal stabilizing surfaces can be varied in accordance with the desired flight conditions, and in some instances they may be eliminated altogether. Various alternative propulsion devices can be used. For example, instead of the gimbaled internal combustion and electric motors shown, it is possible to utilize fixed motors in conjunction with adjustable control surfaces, and to position the propulsion motors elsewhere on the aircraft, for example above the aircraft, or at the trailing edge. In those cases where the upper and/or lower membranes tend to flutter, fluttering can be prevented by inflating the space between the upper and lower membranes.

Still other modifications may be made to the apparatus and method described above without departing from the scope of the invention as defined in the following claims.

What is claimed is:

1. A delta shaped aircraft having a nose and a trailing edge, the aircraft comprising:
   plural inflated, elongated, flexible tubes, diverging from one another from the nose toward the trailing edge, each tube having an upper surface and lower surface, a nose end adjacent to the nose of the aircraft and a tip end adjacent to the trailing edge of the aircraft;
   a length of cable extending along the trailing edge and connecting the tip end of each tube with the tip end of each adjacent tube;
   a first membrane spanning the upper surfaces of the tubes and constituting an upper airfoil surface of the aircraft; and
   a second membrane spanning the lower surfaces of the tubes and constituting a lower airfoil surface of the aircraft.

2. A delta-shaped aircraft according to claim 1, in which at least one of said first and second membranes is connected to said length of cable.

3. A delta-shaped aircraft according to claim 1, in which said length of cable is a first length of cable, and including a second length of cable extending substantially parallel to the first length of cable and positioned aft thereof, and a flap comprising a strip of flexible material extending from the first length of cable to the second length of cable.

4. A delta-shaped aircraft according to claim 3, including means, connected to said second length of cable at the ends thereof for adjusting the height of the ends of the second length of cable relative to the first length of cable.

5. A delta-shaped aircraft according to claim 1, including means for adjusting tension in said length of cable.

6. A delta-shaped aircraft according to claim 1, in which each of said plural, inflated, elongated flexible tubes has a rigid plate located at the tip end thereof, a clamping member fixed to said plate and extending into the interior of said tip end, and a clamping ring securing the tip end to the clamping member.

7. A delta-shaped aircraft according to claim 6, in which the length of cable is connected directly to each said rigid plate.

8. A delta-shaped aircraft according to claim 7, in which the cable has threads at both ends and is adjustably connected to each said rigid plate by a nut engaged with said threads whereby tension in the cable can be adjusted.

9. A delta-shaped aircraft according to claim 1, in which each of said plural, inflated, elongated, flexible tubes has a rigid plate located at the nose end thereof, a clamping member fixed to said plate and extending into the interior of said nose end, and a clamping ring securing the nose end to the clamping member.

10. A delta-shaped aircraft according to claim 9, in which the rigid plates at the nose ends of the plural, inflated, elongated flexible tubes are rigidly connected together, and having a propulsion motor connected to said plates.

11. A delta-shaped aircraft according to claim 9, including a gimbal assembly connecting said propulsion motor to said plates.

12. A delta shaped aircraft having a nose and a trailing edge, the aircraft comprising:
    plural inflated, flexible tubes, each inflated, flexible tube being in the form of a body of revolution with an axis, the axes of the bodies of revolution being substantially coplanar, substantially intersecting one another at a location adjacent to the nose of the aircraft and diverging from one another from the nose toward the trailing edge, and each tube having an upper surface and lower surface, a nose end with a large cross-section adjacent to the nose of the aircraft and a tip end with a smaller cross-section adjacent to the trailing edge of the aircraft, and tapering to its tip end at least from an intermediate location between its nose end and its tip end;
    a length of cable extending along the trailing edge and connecting the tip end of each tube with the tip end of each adjacent tube;
    a first membrane spanning the upper surfaces of the tubes and constituting an upper airfoil surface of the aircraft; and
    a second membrane spanning the lower surfaces of the tubes and constituting a lower airfoil surface of the aircraft.

13. A delta-shaped aircraft according to claim 12, in which at least one of said first and second membranes is connected to said length of cable.

14. A delta-shaped aircraft according to claim 12, in which said length of cable is a first length of cable, and including a second length of cable extending substantially parallel to the first length of cable and positioned aft thereof, and a flap comprising a strip of flexible material extending from the first length of cable to the second length of cable.

15. A delta-shaped aircraft according to claim 14, including means, connected to said second length of cable at the ends thereof for adjusting the height of the ends of the second length of cable relative to the first length of cable.

16. A delta-shaped aircraft according to claim 12, including means for adjusting tension in said length of cable.

17. A delta-shaped aircraft according to claim 12, in which each of said plural, inflated, flexible tubes has a rigid plate located at the tip end thereof, a clamping member fixed to said plate and extending into the interior of said tip end, and a clamping ring securing the tip end to the clamping member.

18. A delta-shaped aircraft according to claim 17, in which the length of cable is connected directly to each said rigid plate.

19. A delta-shaped aircraft according to claim 18, in which the cable has threads at both ends and is adjustably connected to each said rigid plate by a nut engaged with said threads whereby tension in the cable can be adjusted.

20. A delta-shaped aircraft according to claim 12, in which each of said plural, inflated, flexible tubes has a rigid plate located at the nose end thereof, a clamping member fixed to said plate and extending into the interior of said nose end, and a clamping ring securing the nose end to the clamping member.

21. A delta-shaped aircraft according to claim 20, in which the rigid plates at the nose ends of the plural, inflated flexible tubes are rigidly connected together, and having a propulsion motor connected to said plates.

22. A delta-shaped aircraft according to claim 20, including a gimbal assembly connecting said propulsion motor to said plates.

\* \* \* \* \*